INVENTOR
EDWARD C. PETERSON
BY
ATTORNEYS

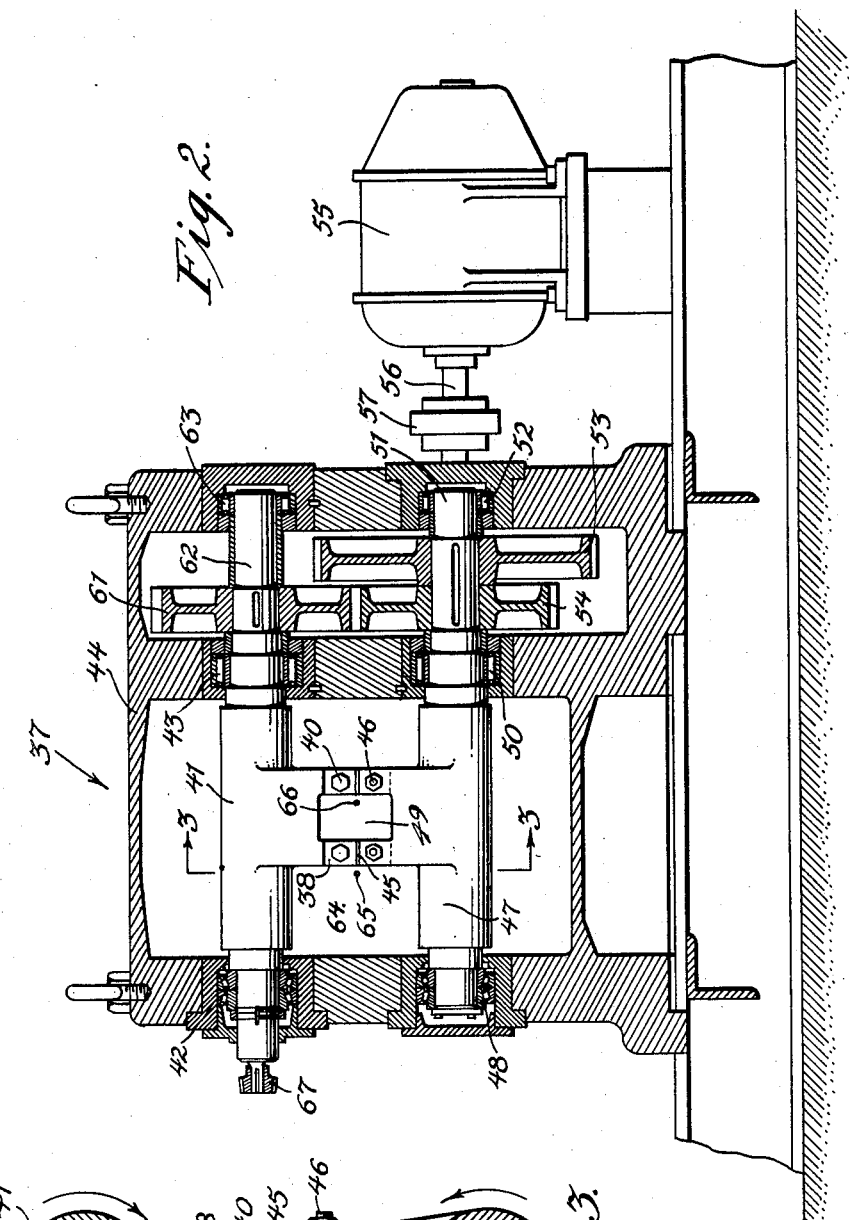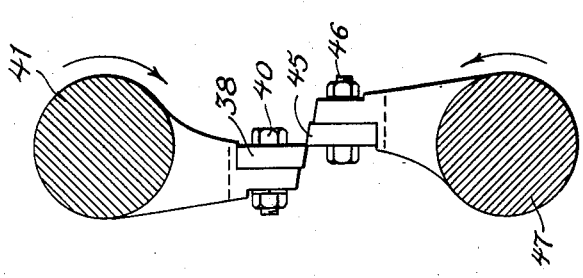

Feb. 9, 1960  E. C. PETERSON  2,924,136
FLYING SHEAR

Filed Aug. 13, 1956  6 Sheets-Sheet 5

INVENTOR
EDWARD C. PETERSON
BY
ATTORNEYS

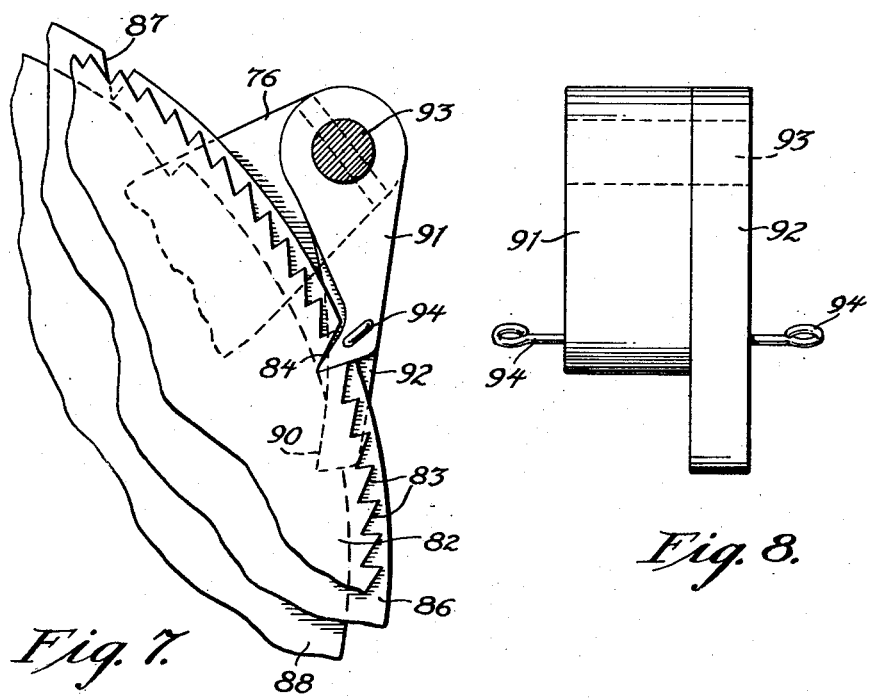
Fig. 7.
Fig. 8.
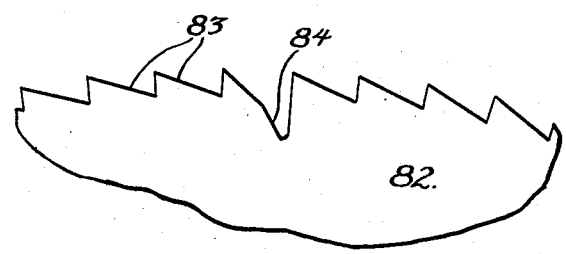
Fig. 9.
INVENTOR
EDWARD C. PETERSON
BY
ATTORNEYS

United States Patent Office 2,924,136
Patented Feb. 9, 1960

2,924,136

FLYING SHEAR

Edward C. Peterson, Reading, Pa., assignor to Birdsboro Steel Foundry and Machine Company, Birdsboro, Pa., a corporation of Delaware Application August 13, 1956, Serial No. 603,580

1 Claim. (Cl. 83—306)

The present application relates to flying shears for cutting work in motion such as metallic stock coming from a rolling mill or the like.

A purpose of the invention is to provide continuous operation of rotary shear blades of a flying shear on an invariable blade axis, thus eliminating the design, manufacture and maintenance problems incident to intermittent drive and incident to shifting of the blade axis or of the blade position with respect to the axis.

A further purpose is to carry the work along a normal path axially displaced with respect to the cooperating rotary shear blades and to divert the work axially into the space between the rotary shear blades when the blades are not meeting and hold the work in this space until the blades meet and complete the shearing action and then return the work axially to the normal path.

A further purpose is to vary the position to which the work is discharged after meeting of the shear blades to cut the work.

A further purpose is to drive a ratchet accumulator in synchronism with the rotary shear blades, when the accumulator counts out to drive a drive wheel from the ratchet accumulator, and by the motion of the drive wheel to reciprocate carriers guiding the work before it enters the shear and after it leaves the shear laterally into the cutting path and out of the cutting path.

A further purpose is to change the discharge point of the guide on the discharge side of the shear in response to the motion of the drive wheel so as to change the point of discharge.

A further purpose is to utilize the motion of the shear itself to determine the distance on the work in terms of shear revolutions between successive cuts, and to operate the guide mechanism to accomplish the cutting in response to counting action initiated by the shear.

A further purpose is to provide a ratchet wheel having ordinary teeth and a special tooth, there being an uneven number of teeth in the sprocket wheel, and to so relate the number of teeth to the motion of the pawl so that the pawl tooth will engage each of the ordinary teeth between successive engagements with the special tooth.

Further purposes appear in the specification and in the claims.

In the drawings I have chosen to illustrate one only of the numerous embodiments in which my invention may appear, selecting the form shown from the standpoints of convenience in illustration, satisfactory operation and clear demonstration of the principles involved.

Figure 2 is an enlarged section on the line 2—2 of Figure 1.

Figure 3 is a fragmentary enlarged section transverse to the axis showing the shear blades meeting, the section being taken on the line 3—3 of Figure 2.

Figure 7 is a fragmentary perspective of the ratchet accumulator.

Figure 8 is a front elevation of the pawl shown in Figure 7.

Figure 9 is a fragmentary side elevation of the portion of the ratchet having the pickup tooth.

Figure 1:
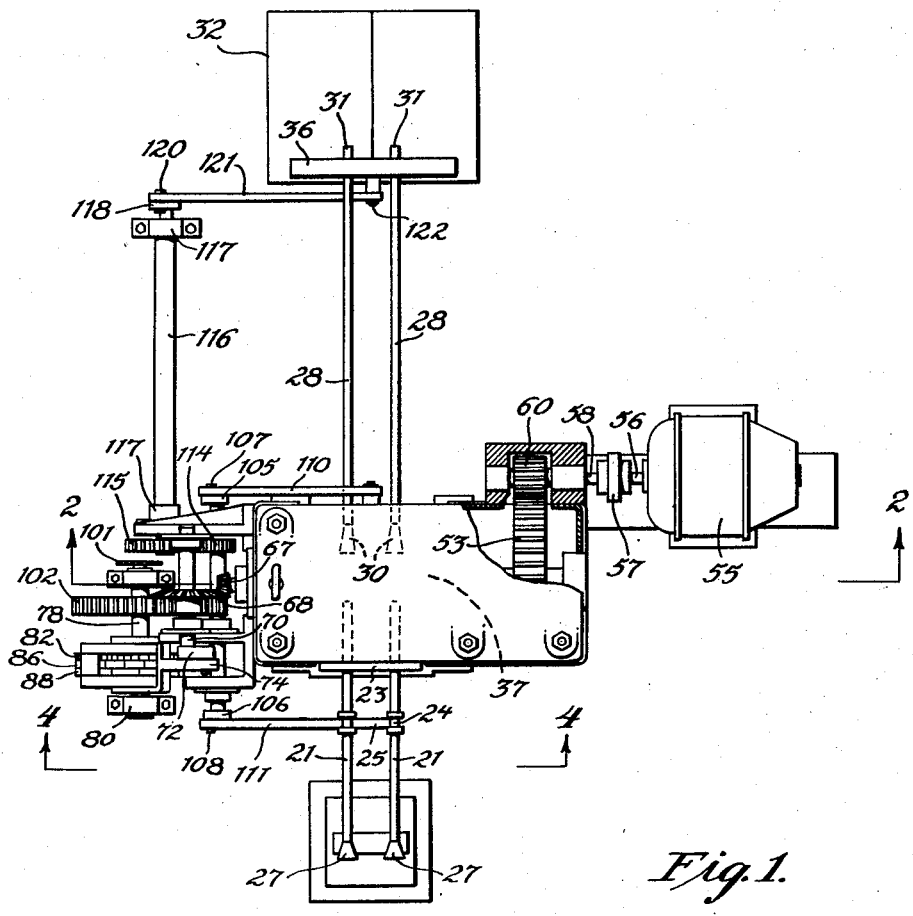
Figure 1 is a partially diagrammatic top plan view with the cover plate broken away, showing the shear of the invention.
Figure 4:
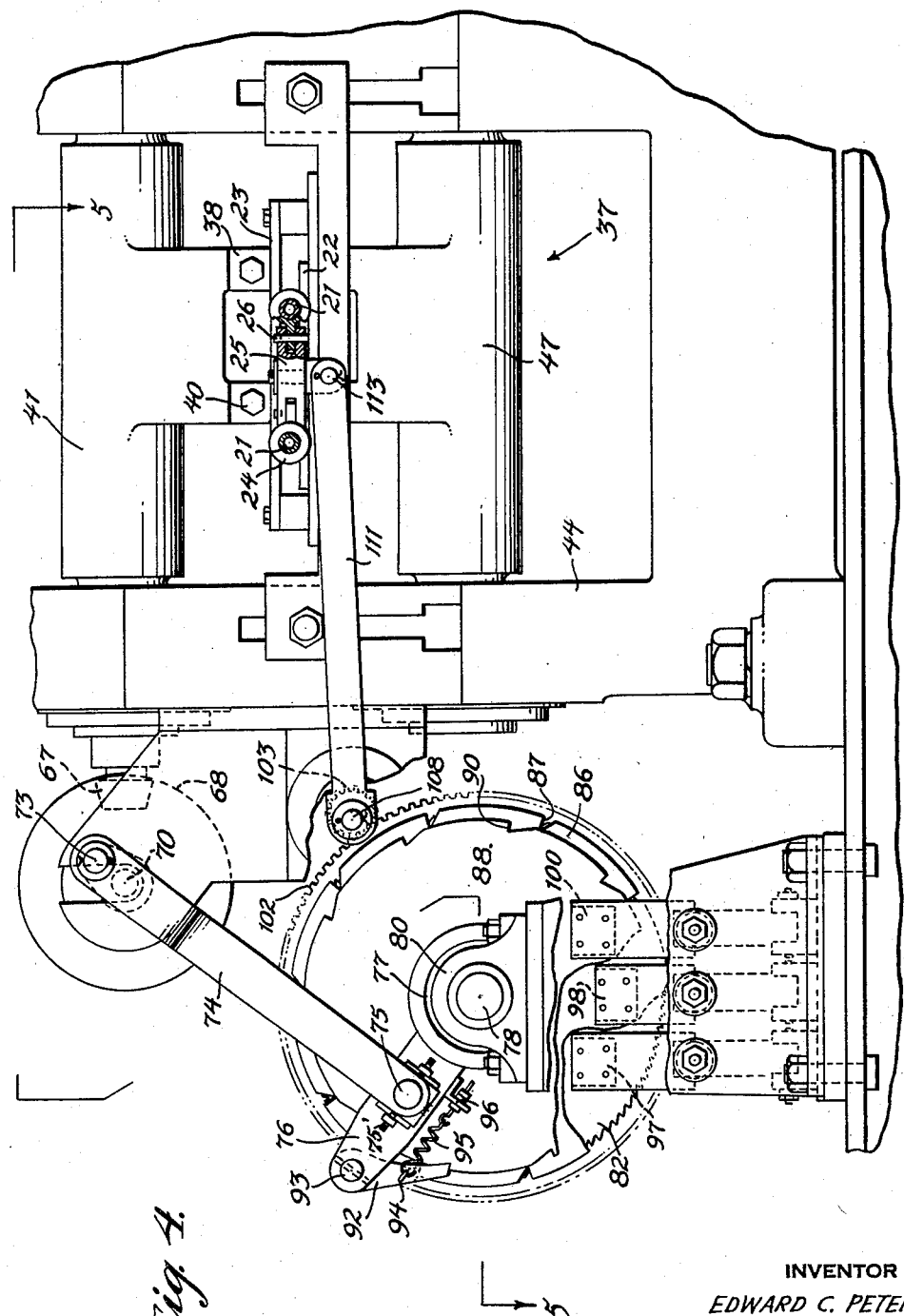
Figure 4 is an enlarged axial section on the line 4—4 of Figure 1, showing the counting mechanism.
Figure 5:
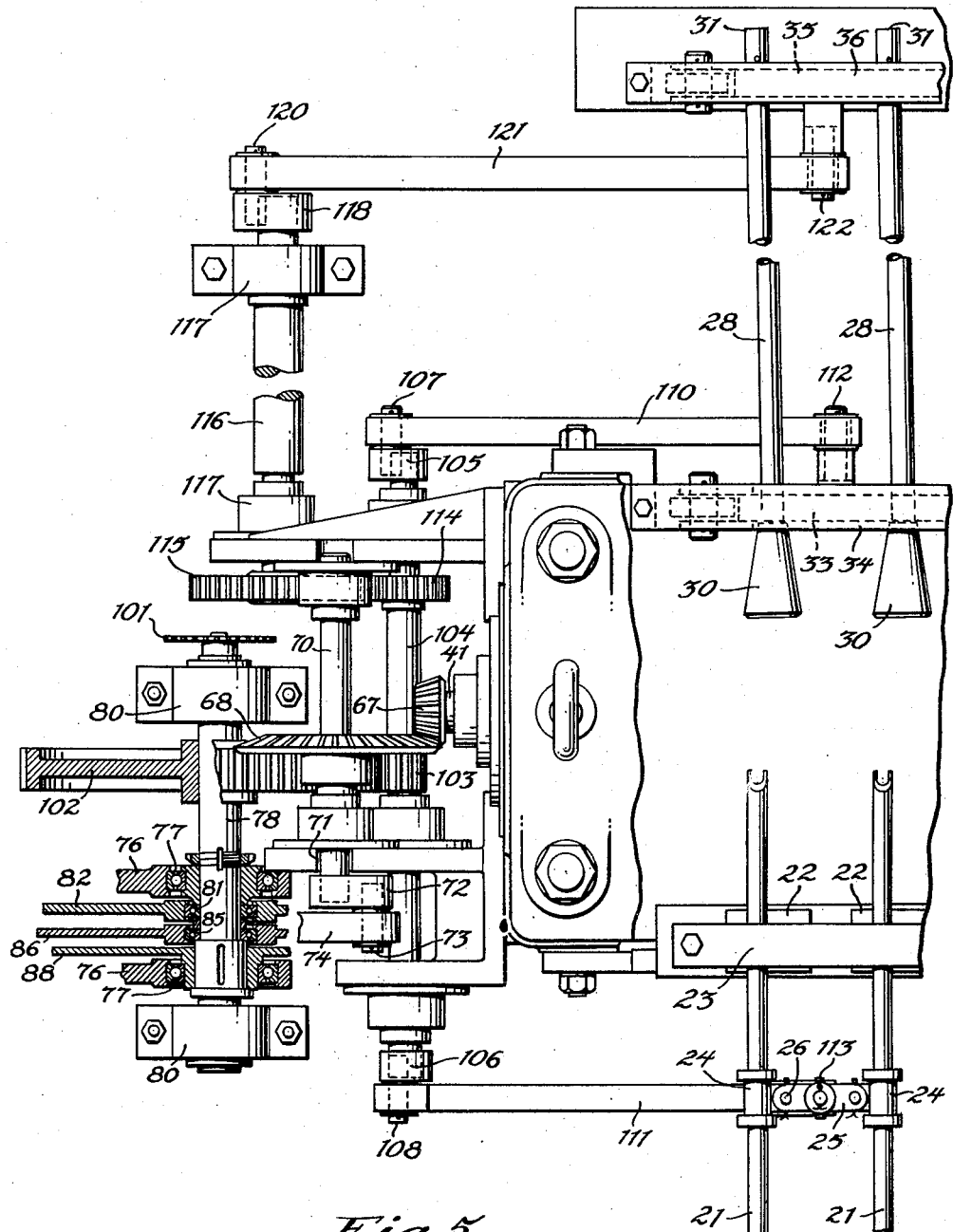
Figure 5 is a fragmentary horizontal section on the line 5—5 of Figure 4.
Figure 6:
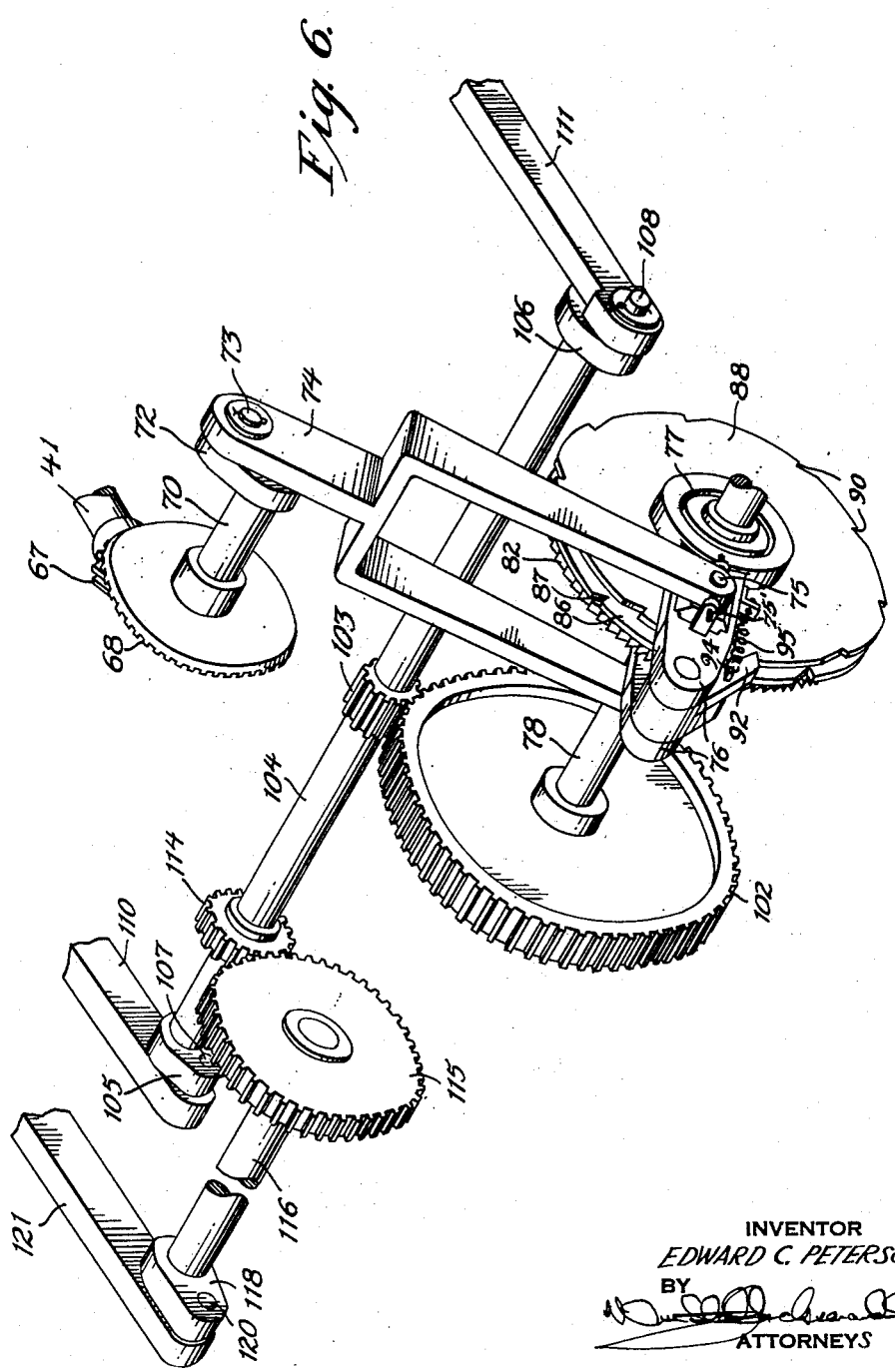
Figure 6 is a fragmentary perspective showing the gearing.

Describing in illustration but not in limitation and referring to the drawings:

Existing flying shears are of several different types, none of which are completely satisfactory from the standpoint of simplification of design, low cost and ease of maintenance. Some flying shears involve forward motion of non-rotating elements, which must be stopped and returned before the shear can again operate. Other types which use rotating knife blades require that the blades be accelerated to approximate the speed of the work in order to cut, and then stopped before the shear can again operate.

It is very desirable to have the shear blades continuously rotate at a substantially constant speed. This has, however, in the past necessitated either relative motion of the axes of the rotating shear blades, or relative movement of one of the shear plates with respect to the axis while the shear is rotating. In either case the mechanism has necessarily been relatively costly, complicated and difficult to maintain. The present invention contemplates the employment of two continuously rotating cooperating shear blades which meet periodically, suitably once each rotation. The work is guided along a normal path axially displaced from the shear blades, and when the work is to be cut it is carried into the space between the shear blades at a time when the shear blades are not meeting, and held in this position until the shear blades meet and cut the work. The work is then returned axially to its normal path. The motion of the work is desirably accomplished by axially movable carriers or guides which engage the work before it enters the shear and after it leaves the shear.

Each time the shear cuts it will in many cases be desirable to change the point of discharge. One reason for doing this is that the receiving mechanism, for example the coiler, will be changed after each cut. In accordance with the invention the change in discharge position is desirably accomplished automatically after each cut.

In one desirable form of the invention as illustrated, the shear itself drives a ratchet accumulator, which when it counts out advances the drive wheel. The drive wheel desirably shifts the guides laterally to bring the work into the shear and out of the shear and also changes the discharge position at the end of the cut.

When reference is made herein to work, it is intended to designate stock, such as bars, rods, shapes, wire, strip or other metallic material progressing longitudinally in the direction of the major axis. The flying shear will usually be employed in connection with a rolling mill or similar metal processing equipment to cut the work into pieces of desired length. The actual metal may be steel in any of its compositions or alloys, copper base alloy, aluminum base alloy, magnesium base alloy, titanium base alloy, or any other suitable metal or alloy.

The shear itself may be of any one of a wide variety of types which may themselves be old in the art except in the present combination.

Considering now the drawings in detail, the work passes from a rolling mill 20 through either of the inlet guides 21 (suitably pipe) which are mounted for axial motion (with respect to the shear) between bottom shoes 22 and a top shoe 23 supported on the frame and extending transverse to the guides. The guides carry flanged tongue elements 24 which connect to a central clevis element 25 by pins 26. The guides suitably have funnel elements 27 on the inlet end.

The work passes from the inlet guides to the shear to be described, and then out through outlet guides 28 suitably of tubular form having funnel inlets 30 and discharging at 31 to any suitable equipment, desirably a pair of coiler approach troughs indicated generally at 32.

The outlet guides at their inlet ends are mounted in a carrier 33 which reciprocates axially of the shear in shoes 34 similar to the shoes previously described. At the outlet end the outlet guides are supported by a carrier 35 which reciprocates axially of the shear in shoes 36 to shift the discharge end of the outlet guides from the position of one coiler to the position of another coiler.

The shear itself may be of well known character, but differently operated from the shears in the prior art.

In the preferred embodiment the shear 37 comprises two pairs of laterally spaced shear blades, each comprising an upper rotary knife 38 mounted by bolt 40 on an upper shear shaft 41, turning in bearings 42 and 43 on the shear frame 44, and a lower shear knife 45 mounted by a bolt 46 on a lower shear shaft 47 turning in bearings 48 and 50 in the shear frame 44. The shear blade pairs are separated by a space 49 through which one of the rods to be sheared passes in non-shearing position.

The lower shaft 47 has an extension 51 having an outboard bearing 52 in the frame and carrying keyed thereon gears 53 and 54. Driving motor 55 drives shaft 56 through suitable coupling 57 to shaft 58 journaled in the frame and carrying pinion 60 meshing with gear 53 on the lower shear shaft. Gear 54 on the lower shear shaft intermeshes with a gear 61 keyed on an extension 62 of the upper shear shaft, the extension having an outboard bearing 63 in the frame.

The pairs of shear knives meet at intervals, suitably each revolution, as shown in Figure 3. One work rod passes through the space 64 at the position 65 when it is not being cut. The other work rod passes through the space 49 at the position 66 when it is not being cut. When it is desired to cut, both work rods are moved from the positions 65 and 66 respectively to the right in Figure 2 until they are engaged to cut by the shear knives. This movement takes place at a time when the shear knives are not meeting and the work is held in the cutting position until after the shear knives have met and cut the work. This is best shown in Figure 2.

The upper shear shaft carries a beveled pinion 67 at the end remote from the gear 61 and this meshes with bevel gear 68 on main counting shaft 70. The main counting shaft is journaled at 71 in the frame and carries a crank 72 whose crank pin 73 pivotally connects to arm 74.

The arm 74 is bifurcated, and adjoining ends of the bifurcated parts remote from the crank pivotally connect at 75 with pawl arms 76 which are journaled at 77 on a shaft 78 turning in bearings 80 in the frame. The pivot at 75 is desirably adjustable radially by screws 75' which move the pivot radially in or out over a small adjustment range.

The shaft 78 journals at 81 a ratchet disc 82 having at its outside circumference a series of small ratchet teeth 83 and a few, preferably only one, deep ratchet teeth 84, best seen in Figures 7 and 9. The number of teeth in the ratchet disc 82 is suitably an uneven number, one suitable example being 111. By choosing the proper number of teeth in reference to the stroke of the pawl arms 76, the pawl 91 to be described is permitted to progress serially around the ratchet disc engaging every tooth in a series of steps progressively after it leaves the deep tooth before it again engages the deep tooth. This is very important in providing for a proper counting arrangement. If a very small movement of the pawl arm 76 were used, so that the arm would only move the pawl one tooth at a time, the corresponding angular motion of the drive wheel 88, to be described, would be very small and it would be extremely difficult to get accuracy of operation of mechanism driven by the drive wheel 88.

The shaft 78 also journals at 85 a guide wheel 86 which has a series of infrequent teeth 87 which permit entry of the pawl, to be described, and prevents the deep entry of the pawl until the pawl picks up one of these teeth. If the guide wheel were not present the pawl 91 would clatter over all of the teeth on the ratchet disc 82 causing undue wear and tear and adding to the noise. The guide disc 86 has a tooth space to correspond to the stroke of the pawl arms 76 so that it merely lifts the pawl 91 across the top of the intervening teeth and permits it to drop down in the tooth which it would normally fall into at the back end of its stroke, even if the guide disc 86 were not present. A driving wheel 88 is keyed on the shaft 78 and carries ratchet teeth 90. All ratchet teeth 90 operate in the same direction.

The pawl 91 has a short tooth and also has a long tooth 92, as best seen in Figure 7. The pawl is pivotally mounted on a shaft 93 secured across the pawl arms 76.

The pawl 91 has spring abutments 94 which are engaged by the outer ends of spiral tension springs 95 secured to spring anchors 96 on the arms 76.

As already explained, the odd number of teeth in the ratchet wheel associated with the stroke of the pawl assures that the pawl will span several teeth and engage every one of the normal ratchet teeth 83 between successive engagements with the deep tooth 84. Until a deep tooth is encountered, the pawl can only make engagement with normal ratchet teeth. When a deep tooth is encountered, the pawl 91 swings inwardly under the action of the springs 95 and tooth 92 engages in a drive tooth 90. The motion of the arm 76 under the action of the crank 72 then advances the drive wheel over the distance of the crank stroke, the action taking place against the action of brakes 97, 98 and 100 acting respectively on the ratchet wheel, the guide wheel and the drive wheel.

As the drive wheel 88 advances it turns drive shaft 78, turning sprocket 101 on the end of the drive shaft 78 and turning gear 102 keyed on the drive shaft.

Sprocket 101 is suitable to actuate a limit switch to stop the coiler and initiate its discharge cycle if desired.

Gear 102 meshes with and turns pinion 103 secured on crank shaft 104 journaled in the frame. Crank shaft 104 at opposite ends carries cranks 105 and 106 which mount crank pins 107 and 108 which pivotally connect to connecting rods 110 and 111 which pivotally connect at the outer ends respectively at 112 with the carrier 33 which manipulates the inlet end of the outlet guides and at 113 with the carrier 25 which manipulates the inlet guides.

Shaft 104 also carries gear 114 which meshes with gear 115 secured on shaft 116 journaled at 117 on the frame. Shaft 116 at the opposite end carries a crank 118 which through crank pin 120 pivotally connects with connecting rod 121 which at the opposite end pivotally connects at 122 with the carrier 35 which manipulates the outlet end of the outlet guides 28.

It will be noted that by the gear ratio between shafts 104 and 116, while the inlet guides and the inlet end of the outlet guides are making a complete stroke forward and backward from normal positon to cutting position and back again to normal position, the outlet end of the outlet or delivery guides makes only a half stroke, thus directing the work alternately to one coiler and then the other.

In operation, the work normally is carried through the space axially removed from the rotary cutters and in effect by-passes the flying shear until a cut is to be made. The flying shear turns continuously and gear 67 drives gear 68 which through crank 72 reciprocates arm 74, moving the pawl arms 76 back and forth through successive cycles. Each time the pawl arms advance, the pawl tooth engages in one of the normal teeth of the ratchet wheel, being guided by the outer rim of the guide wheel. The pawl also encounters one of the guide wheel teeth at the ends of its stroke. In any case the pawl cannot move far enough in to engage any of the teeth of the drive wheel and the drive wheel and its associated mechanism remain inactive. When the abnormal deep tooth 84 in the ratchet tooth is encountered, the pawl is free to move inward into the deep tooth and it seats in one of the teeth of the drive wheel and carries the drive wheel forward during the remainder of the forward stroke. This distance is adequate to turn shaft 104 through one complete cycle of cranks 105 and 106 and to turn shaft 116 through one-half cycle of crank 118. Furthermore, this motion is synchronized with the rotation of the cutters so that the cutters are apart at the time that the guides move over to carry the work between the cutters. The cutters then come together and cut the stock and before the cutters can come together again the continued motion has carried the guides laterally to clear the cutters. At the same time the half stroke action of crank 118 has shifted the discharge end of the outlet guides to discharge the work to the opposite coiler.

In view of my invention and disclosure variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claim.

Having thus described my invention, what I claim as new and desire to secure by Letters Patent is:

In a flying shear, a pair of cooperating shear blades, means for turning the shear blades and bringing them into periodic engagement, guide means carrying the work on a normal path displaced axially beyond the shear blades, means actuated when the shear blades are out of engagement for moving the work axis into the space between the shear blades and holding the work there until the shear blades meet, the means for moving the work axis comprising an inlet guide for reciprocating the work axis before the work reaches the position of the shear blades and an outlet guide for reciprocating the work axis after the work passes the position of the shear blades, and means for reciprocating the discharge end of the outlet guide means one-half cycle for each cycle of reciprocation of the inlet end of the outlet guide means.

References Cited in the file of this patent

UNITED STATES PATENTS

| | | |
|---|---|---|
| 986,856 | Perrett | Mar. 14, 1911 |
| 1,505,672 | Smith | Aug. 19, 1924 |
| 1,748,289 | Henrich | Feb. 25, 1930 |
| 1,990,105 | Taylor | Feb. 5, 1935 |
| 2,126,528 | Beach | Aug. 9, 1938 |
| 2,234,976 | Muntwyler | Mar. 18, 1941 |
| 2,256,176 | Sheperdson | Sept. 16, 1941 |
| 2,414,772 | Sheperdson | Jan. 21, 1947 |
| 2,711,809 | O'Keefe et al. | June 28, 1955 |

FOREIGN PATENTS

| | | |
|---|---|---|
| 513,639 | Germany | Dec. 1, 1930 |